Dec. 3, 1968  E. H. SIEGLER, JR  3,414,354
RAMAN SPECTROMETERS
Filed Oct. 28, 1964  4 Sheets-Sheet 2
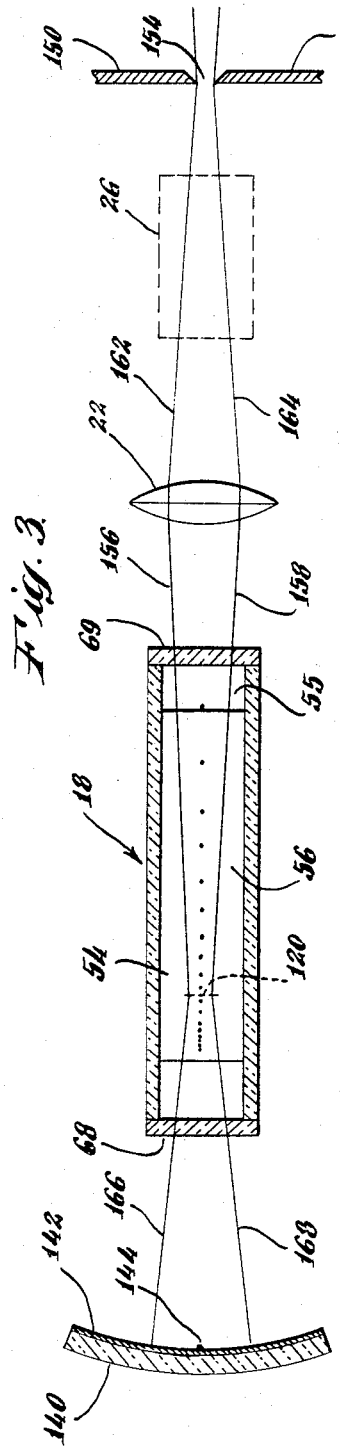
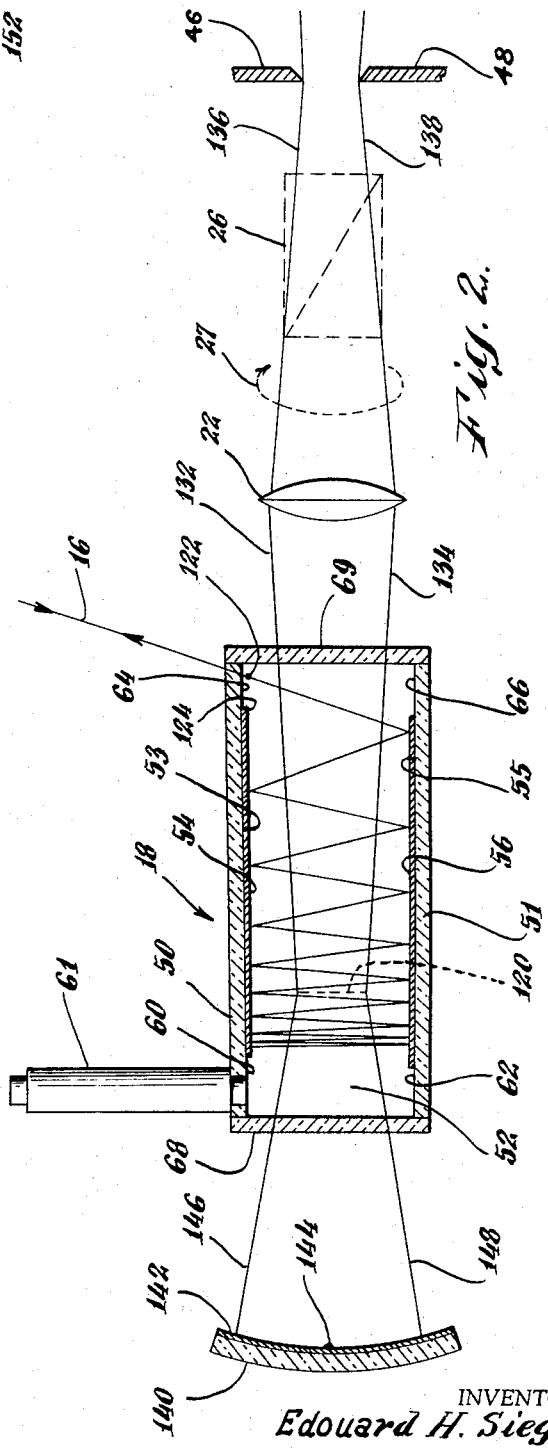
INVENTOR.
Edouard H. Siegler, Jr.
BY
Daniel R. Levinson
ATTORNEY.

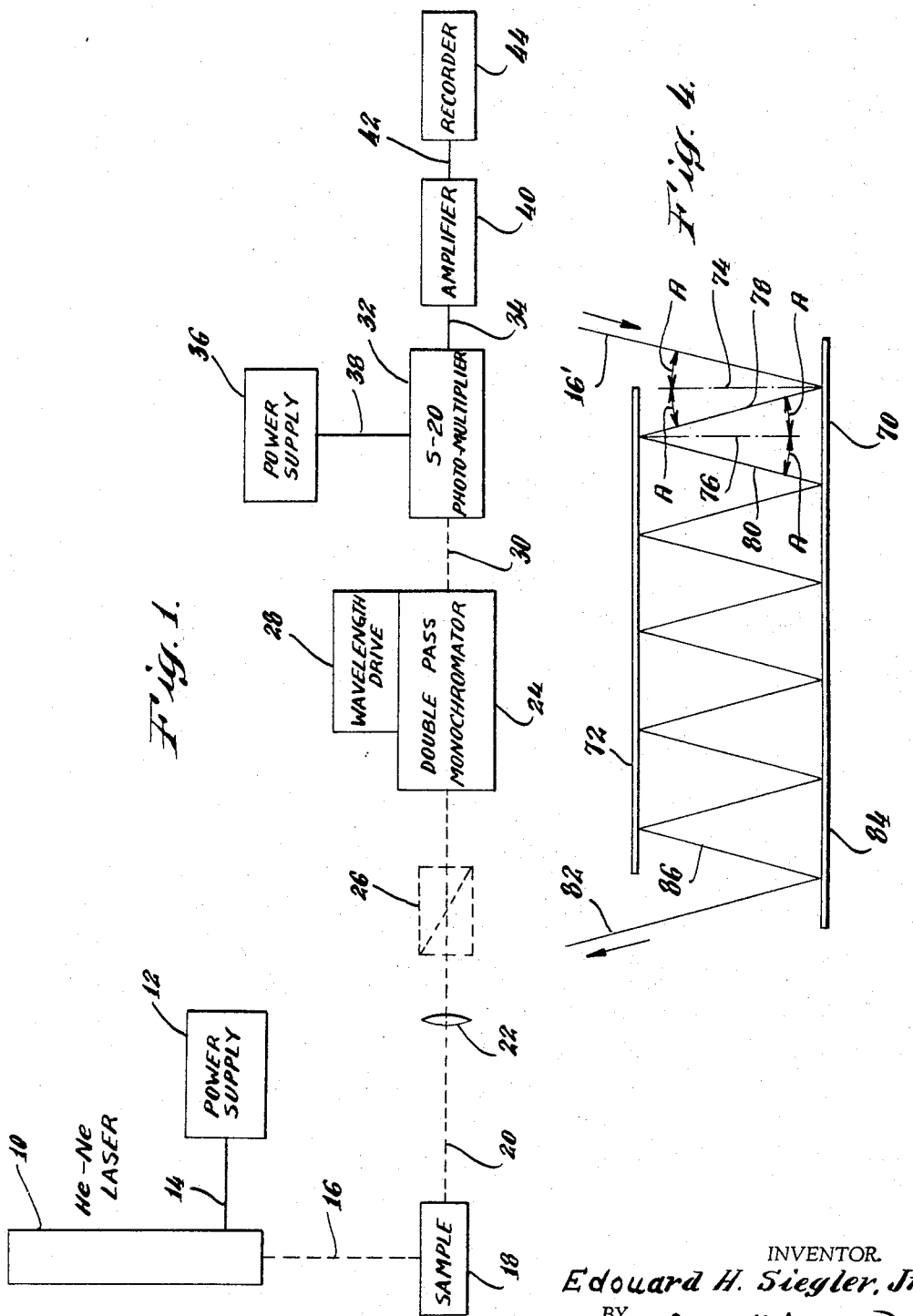

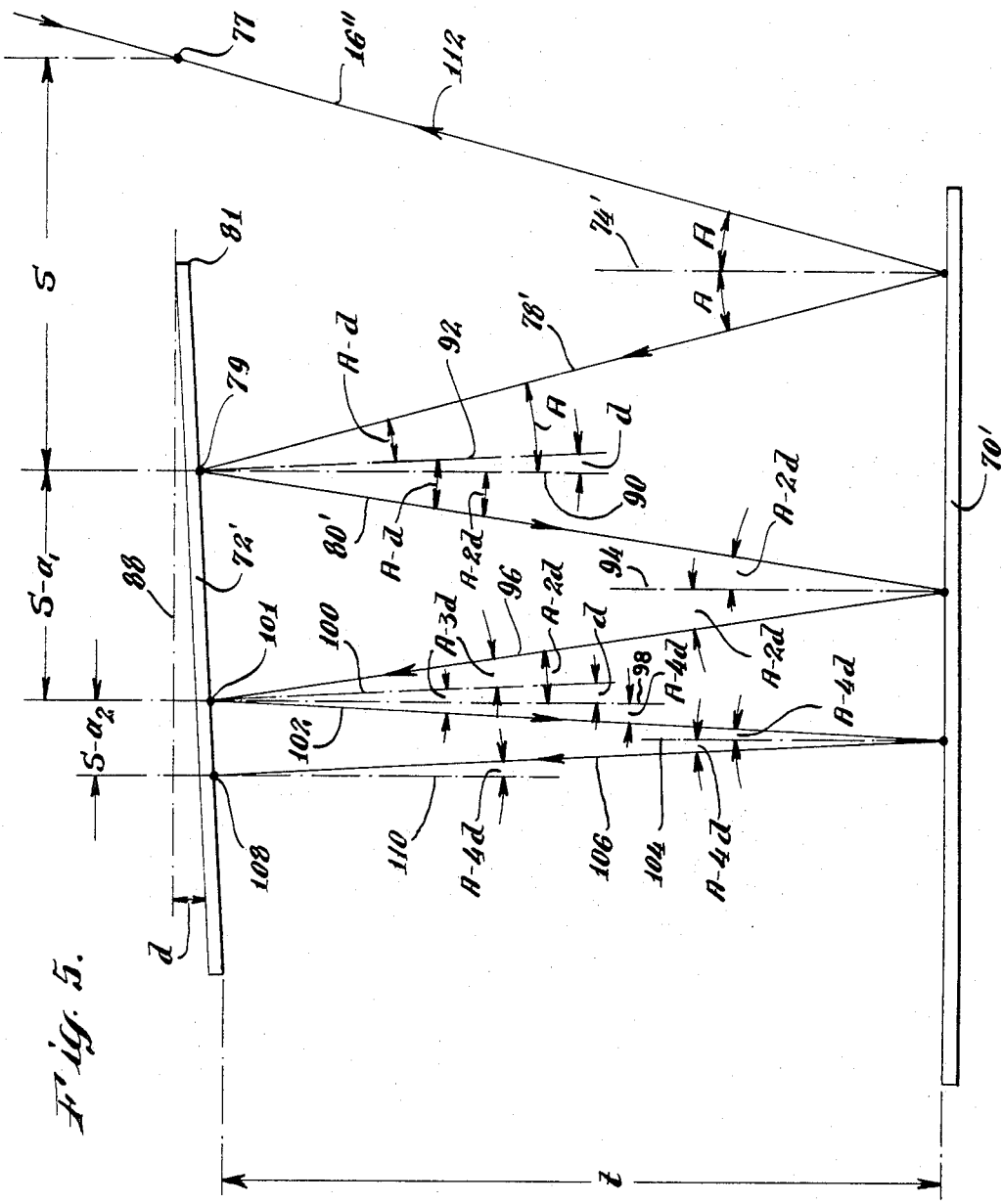

Dec. 3, 1968    E. H. SIEGLER, JR    3,414,354
RAMAN SPECTROMETERS
Filed Oct. 28, 1964    4 Sheets-Sheet 4
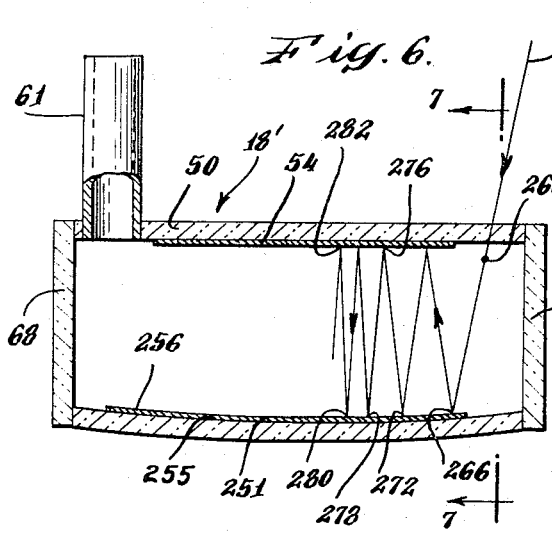
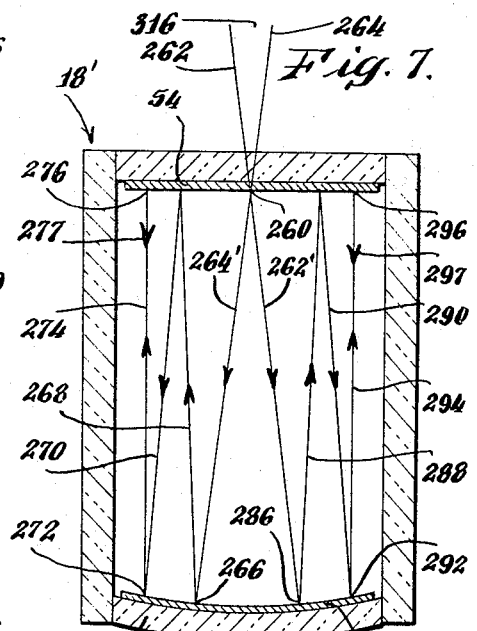
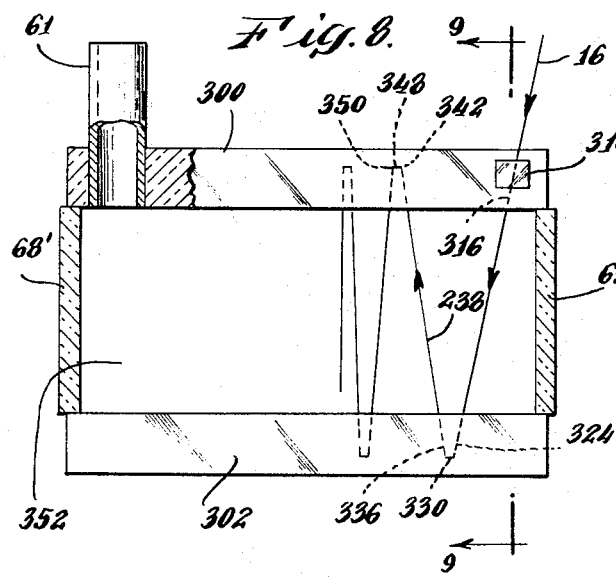
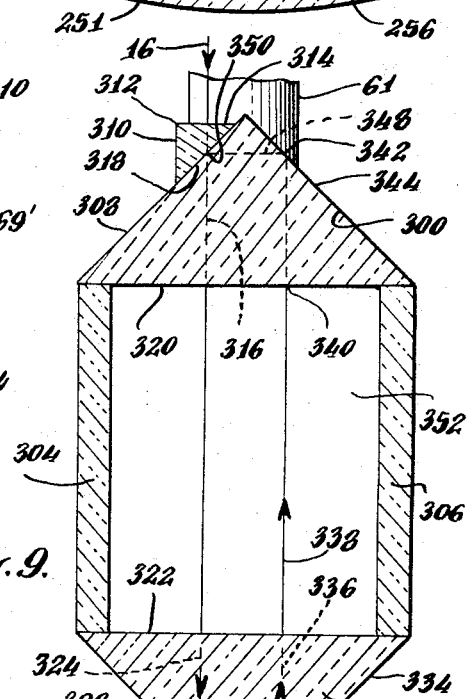
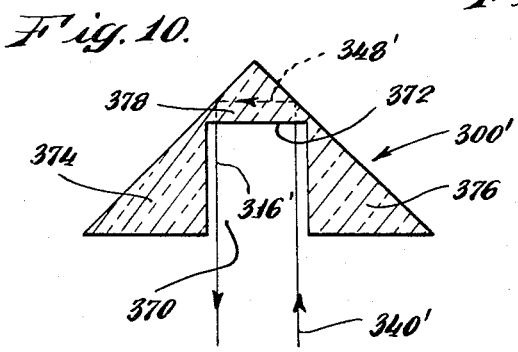
INVENTOR.
Edouard H. Siegler, Jr.
BY Daniel R. Levinson
ATTORNEY though the intensity of the Raman effect
3,414,354
RAMAN SPECTROMETERS Edouard H. Siegler, Jr., Darien, Conn., assignor to The Perkin-Elmer Corporation, Norwalk, Conn., a corporation of New York
Filed Oct. 28, 1964, Ser. No. 407,187
8 Claims. (Cl. 356—75)

ABSTRACT OF THE DISCLOSURE

A Raman spectrometer uses a laser beam to excite the sample. The beam is caused to traverse the sample many times by reflecting it back and forth between two facing reflecting surfaces, one on each side of the sample, thereby increasing the total excitation flux. Preferably, the reflecting surfaces are very slightly canted from exact parallelism so as to cause successive reflected beam paths to become closer and closer, thus concentrating the flux density. Ultimately the reflected beam will reverse its path, almost doubling the excitation flux within the sample. The configuration of the two reflecting surfaces and the sample volume is preferably made to match the shape of the entrance slit of the monochromator collecting the scattered Raman re-radiation.

Introduction

This invention relates to improvements in Raman spectroscopy. More particularly the invention concerns the use of an optical maser (laser) as the source for a Raman spectrometer, and the provision of means for effectively utilizing radiation of the optical maser in the sample, the Raman scattering of which is to be measured.

As is well known, the Raman effect is the scattering by a sample of a beam of light or other radiant energy at frequencies removed from the original frequency of the exciting radiation by specific frequency differences which are characteristic of the molecular vibration frequencies of the sample. In order to provide a useful spectrogram which may be interpreted, the exciting radiation must be highly monochromatic so that the Raman spectrum contains single, relatively sharp indications of where the sample produces such Raman scattering. In addition, since the Raman scattering is a second order effect, the intensity of the highly monochromatic source must also be quite high in order for the Raman scattering to be reasonably measurable by photoelectric means (or to be conveniently recorded by photography).

Although in recent years commercially feasible photoelectric recording Raman spectrometers have been designed, the problem of providing sufficient monochromatic source radiation intensity has caused certain operating difficulties. One technique (as exemplified by United States Letters Patent No. 2,940,355, issued on June 14, 1960 to H. H. Cary) utilizes a high powered mercury arc lamp as the excitation source, and filtering of the mercury arc so as to eliminate all but one spectral line thereof (for example, 4,358 A.). Because of the extremely high power dissipation of the mercury arc lamp (in one commercial embodiment of this device, the mercury arc utilizes 3,000 watts of power), the sample must be both shielded and cooled. Even when the filter between the mercury arc lamp and the sample comprises a circulating chemical solution, additional air or other fluid cooling is normally required. Further, the filter solution, being exposed to such high intensity radiation, tends to degrade in time and requires replacement every few weeks. Also the lamp and filters restrict the space available for the sample holding device.

The present invention utilizes an optical maser as the radiant energy source, thereby eliminating one of the most important practical problems in Raman spectroscopy. Since an optical maser supplies radiation of an extremely high degree of spectral purity (i.e., is extremely monochromatic), no difficult filtering problems are encountered. The entire apparatus (including the sample) remains cool, since the total power output of the optical maser is low. Because the beam from the laser contains radiation concentrated within a spectral band of only a few hundredths of an A. in width, many of the other problems attendant to performing a high grade Raman spectroscopic analysis are also eliminated by such use. Thus Rayleigh and Tyndall scattering is minimized, since it occurs only at the same frequency as the exciting line itself, and the likelihood of fluorescent interference from the sample is reduced. The laser need not surround the sample thereby greatly removing sample space and access limitations. If the optical maser (laser) source can be made to irradiate the sample at a relatively high effective intensity, relatively low frequency (long wavelength) radiation may be used. Thus even though the intensity of the Raman effect is proportional to the fourth power of the frequency of the exciting source, the present invention makes it possible to excite Raman spectra using a 6,328 A. helium-neon maser (which is less than one-fourth as effective as 4,358 A. radiation). The use of such a relatively long wavelength exciting source yields additional advantages. It is less likely to cause photodecomposition of the sample and in many cases may permit the running of analysis on colored samples which would absorb shorter exciting wave lengths. The use of the laser also facilitates depolarization measurements, since the laser output is not only well collimated but is also very highly plane polarized.

Although the use of a laser as a source greatly simplifies the problem of introducing exciting radiation to the sample, since neither any extensive filtering (and accompanying cooling systems) are required, the relatively low intensity of the beam of presently available optical masers is advantageously introduced to the sample area so as to increase the effective intensity of the laser beam. In order to accomplish this, a novel sample compartment configuration is provided by the invention, which causes the effective intensity of the exciting source to be substantially greater than would be the case if the laser beam were simply passed through the sample in a straightforward, conventional manner.

An object of the invention is therefore the provision of a Raman spectrometer employing an optical maser as the excitation source and means for effectively utilizing the laser beam in the sample.

Another object of the invention is the provision of means for effectively concentrating the exciting radiation supplied to a sample.

A similar further object is the provision of a sample compartment of such construction as to cause the effective power of exciting radiation as it affects the sample to be greater than the actual intensity of the original beam.

Further objects and advantages of the invention will become obvious to one skilled in the art upon reading the following specification in conjunction with the accompanying drawings in which:

FIGURE 1 is a partly schematic representation of the entire Raman spectrometer;

FIGURE 2 is an enlarged vertical section through parts of the apparatus illustrating the manner in which the exciting laser beam is concentrated in the sample and the manner in which the Raman scattering is collected and presented to the monochromator;

FIGURE 3 is a horizontal section through the same parts of the apparatus as in FIGURE 2;

FIGURE 4 is a schematic side view of the manner in which a pair of facing, exactly parallel plane mirrors will reflect a ray;

FIGURE 5 is an enlarged, schematic side view, corresponding generally to FIGURE 4, but in which the upper plane mirror has been rotated slightly counterclockwise so as to be no longer exactly parallel to the lower mirror;

FIGURE 6 is a vertical, longitudinal section through a sample cell, which differs from the one shown in FIGURE 2 by having its lower reflecting surface curved;

FIGURE 7 is a vertical lateral section taken on the line 7—7 in FIGURE 6;

FIGURE 8 is a vertical longitudinal section through a further modified sample cell, in which the upper and lower reflectors are in the form of totally internally reflecting prisms;

FIGURE 9 is a vertical lateral section taken on the line 9—9 in FIGURE 8; and

FIGURE 10 is a vertical, lateral sectional detail, showing a modification of the upper prism of FIGURES 8 and 9.

General description

In FIGURE 1 a continuous helium-neon optical maser 10 is shown as being supplied with electrical energy from power supply 12 over electrical leads 14. Such a continuous gas phase laser will produce, at one end thereof, a highly monochromatic coherent collimated beam of radiation having almost pure 6328 A. wavelength radiation. This collimated monochromatic red beam, diagrammatically represented by ray path 16, is introduced into the sample in sample compartment 18 in one direction, which will be considered to be substantially vertical for convenience in referencing directions, but may of course be in any direction desired. The Raman scattered radiation from the sample in sample compartment 18 is collected in a direction substantially perpendicular to the direction of the original exciting beam 16. In the illustrated embodiment this collection direction is represented by ray path 20, extending horizontally. At least a substantial part of the Raman scattered radiation will be collected by an optical system represented by lens 22 so as to be focused on the entrance slit of a monochromator 24. Glans-Thompson, Foucault or other polarizing prism 26 may be optionally positioned in the collected Raman radiation prior to its reaching the monochromator so as to allow depolarization analysis. In addition to being removable, polarizing prism 26 is also preferably mounted so as to be rotatable about the axis of the radiation (i.e., about a horizontal axis as shown in FIGURE 1). The specific preferred manner in which laser beam 16 is made to irradiate the sample in sample cell 18 and the manner in which the resulting Raman scattered radiation is collected will be more specifically described hereinafter in conjunction with FIGURES 2 and 3.

Monochromator 24 is preferably of high resolution, for example, a double-pass grating monochromator of the type manufactured by The Perkin-Elmer Corporation and sold thereby as the model 99-G double-pass monochromator. The grating utilized is preferably one having approximately 1,440 lines per millimeter, which is blazed at an angle corresponding to approximately 7,000 A. in the first order. Preferably the various collecting, directing and collimating mirrors in the monochromator are modified so as to have on their front surfaces, instead of aluminum coatings (which reflect less than 90% of the incident radiation) multilayer dielectric coatings, having reflectance about 99% over the relatively narrow spectral band width utilized. The monochromator may be scanned, either manually or, preferably, with a multispeed, motorized wavelength drive over Raman shifts ranges of about 30 cm.$_{-1}$ to 3800 cm.$_{-1}$ from the exciting wavelength (6328 A.). In terms of wavelength, the radiation measured may extend from about 6,000 A. to about 8,500 A. Such a multispeed mechanized wavelength drive is indicated at 28 in FIGURE 1. Leaving the exit slit at the right-hand side of monochromator 24 will be a beam of radiation 30 of very narrow spectral band width, determined by the setting of the scanning wavelength drive of the monochromator at that particular moment. A highly sensitive photomultiplier 32 will then detect the intensity of the radiation at the frequency to which the monochromator is set, and provide over electrical lead 34 a low level output signal proportional to this intensity. Photomultiplier 32 may comprise, for example, a 14-stage end-on multiplier phototube having an S-20 response. The photomultiplier is supplied with driving power by power supply 36 over lead 38. The photomultiplier output carried by lead 34 is amplified by amplifier 40, which supplies over lead 42 a driving signal for recorder 44 proportional to the intensity of the radiation present at the exit end 30 of the monochromator. Amplifier 40 may be a model 107 amplifier manufactured by The Perkin-Elmer Corporation, and recorder 44 may be a model G strip chart recorder, manufactured by the Leeds and Northrup Corporation.

The optical maser 10 may be, for example, a Perkin-Elmer Model 5200 helium-neon gas laser (supplying 6328 A. radiation) and its associated power supply 12 may be a Perkin-Elmer Model 5202 power supply.

It should be noted that an actual operating prototype of this device requires only 600 watts of power (of conventional 117 volts, 60-cycle alternating "house" current) for the entire apparatus including the motorized wavelength drive, the high voltage power supply 36 for the dynode voltage of the photomultiplier 32, the photomultiplier amplifier 40 and the laser power supply 12. Neither cooling water and the attendant drains nor any special high power multiphase electrical source and leads are required.

Sample irradiation

Figure 2 is an enlarged vertical section through the sample irradiation and Raman scatter collection part of the apparatus. This figure shows the collimated laser beam, as represented by its central ray 16, as entering right end of the top of the sample cell, shown generally at 18; lens 22; polarizing prism 26, and the upper and lower knife edges 46, 48 defining the top and bottom of the monochromator entrance slit. The sample cell 18 comprises a rectangular block of material which is transparent at least for radiation having wavelengths in the vicinity of 6328 A. This sample cell block 18, which may be made of more than one piece cemented or otherwise attached together (such as upper and lower plates 50, 51, respectively, and left and right end plates 68 and 69, respectively), is hollow as shown at 52 so as to be capable of containing the sample (usually contained in a solvent or otherwise in liquid form), which may be introduced through inlet tube 61.

The interior surfaces (53, 55) of upper and lower plates (50, 51) of sample cell block 18 are coated by multiple layers (54, 56) of dielectric material. As will be pointed out hereinafter the exterior surfaces of plates 53, 55 could instead have the dielectric coating. As is well known, such multiple dielectric coatings are made up of a series of extremely thin layers of at least two different dielectric materials, the individual layers having carefully controlled thickness on the order of the wavelength of the radiation with which they are intended to be used. In particular, each of the layers will have a thickness equal to specific fractions of the wavelength of radiation which the entire coating is intended to reflect, altering layers being of materials having different indices of refraction. The technique of making such selective reflectors is well developed in the optical coating art and forms no part of the present invention. It might be noted, however, that since the laser beam, which dielectric coatings 54 and 56 are intended to reflect, is so highly monochromatic, these reflective coatings may approach theoretical perfection in reflectivity, and in fact have been made to exhibit a reflectance of well over 99%. It is coatings of this general type that may be utilized as the reflective surfaces in the monochromator optics, as previously mentioned. The upper and lower flat interior walls 53, 55 of the sample block 18, although plane, are preferably intentionally not quite parallel to each other. In particular, the left-hand end 60 of the upper wall, and the lefthand end 62 of the lower wall are somewhat closer together than the righthand ends 64 and 66 of these walls, respectivley. In other words, planes of the upper and lower interior walls of sample block 50, instead of being exactly parallel, preferably converge slightly so as to meet at some point far to the left of Figure 2. For this reason the thin dielectric coatings 54 and 56 (the thicknesses of which are greatly exaggerated in Figure 2) are also angled in the same manner as their underlying surfaces. The effect of so angling the two reflective surfaces and the sample cell 18 is most easily understood from a comparison of Figures 4 and 5, which are schematics representing the reflection of a ray or parallel beam between two exactly parallel reflective surfaces (Figure 4) and between two slightly canted reflective surfaces (Figure 5, corresponding to the Figure 2 sample cell).

In Figure 4 a parallel beam or a ray of light 16' is caused to impinge upon the lower surface 70 of two exactly parallel plane reflecting surfaces 70 and 72. If the angle of incidence (as measured between incoming ray 16' and the normal 74 to surface 70) is equal to A, the angle of reflection of the first reflection from surface 70 will also be equal to A. Since reflective surface 72 is parallel to reflective surface 70, any normal thereto such as the one shown at 76 will be parallel to the normal 74 or surface 70. For this reason ray 78 (which is the original ray 16' after its first reflection from surface 70) will make the same angle A with normal 76 to surface 72. In other words, reflected ray 78 will have an angle of incidence equal to A on refletcive surface 72. Threefore, the angle of reflection of ray 80 from upper surface 72 will also be equal to angle A. Obviously the reflections will continue in the same manner so that the original ray 16' will be incident on and reflected from each of surfaces 70 and 72 at the same angle A as measured to the normals thereof (which normals are all exactly parallel, namely, all vertical). Thus the illustrated emerging ray 82 will leave the parallel reflectors at the same angle A (but in the opposite sense) as measured from any vertical line. If reflector 70 were ot end at a point such as 84, then the beam would emerge in a downward direction, as represented by ray 86 so as to emerge from the parallel mirrors parallel to the original incoming ray 16' (i.e., downwardly at an angle of A from vertical).

*Theory of preferred sample compartment configuration*

In FIGURE 5 lower reflective surface 70' is exactly horizontal (as was lower reflective surface 70 in Figure 4), but upper reflective surface 72' is canted to the horizontal (represented by dash-dot line 88) by a small angle $d$. In particular, the left-hand end of upper mirror 72' is slightly lower than the right-hand end thereof. Incoming ray 16" is therefore reflected from the lower horizontal mirror 70' in exactly the same manner as occurred in Figure 4. Specifically, incoming ray 16" will make an angle A with the normal 74', and will therefore leave (after reflection by this lower mirror) along ray path 78', making an angle of reflection equal also to angle A. Reflected ray 78' will approach upper reflecting surface 72' at the same angle A to the vertical, but this will not be the angle of incidence on this upper mirror 72' because of its being canted by an angle $d$ to the horizontal. In order to clarify the relationships a perpendicular line 90 is shown as drawn from the point of incidence 79 of ray 78' on upper surface 72' and a dashed line 92 represents the normal to surface 72'. Obviously, the normal 92 will make the same angle $d$ with the vertical line 90. For this reason ray 78' although at an angle of A to vertical line 90, will be at an angle A–$d$ to the normal 92 of surface 72' as labeled in Figure 5. Because of the law of reflection, reflected ray 80' will make the same angle (A–$d$) with normal 92. Observation of the geometry and of the various labeled angles about point 79 in Figure 5 will illustrate that the emerging ray 80' will therefore make an angle of A–2$d$ with vertical line 90. Reflected ray 80' will therefore make an angle of A–2$d$ with the normal 94 to the lower reflective surface 70' (since normal 94 is a vertical line). Therefore, after the second reflection from lower surface 70' ray 96 will also make the same angle (i.e., angle of reflection) with vertical normal 94, namely, A–2$d$.

Ray 96 will therefore approach the upper reflective surface 72' at an angle of A–2$d$ relative to the vertical, as represented by line 98. Since the normal or perpendicular to surface 72', represented by dashed line 100, is at an angle of $d$ relative to this vertical, ray 96 will make an angle of only A–3$d$ to this normal (100). After reflection from point 101 on surface 72', ray 102 will therefore make an angle of reflection of A–3$d$ with normal 100 also, as indicated in FIGURE 5. As may be seen from inspection of FIGURE 5 and the labeling thereof, ray 102 will therefore be at an angle of A–4$d$ from vertical 98 (and of course any other vertical line). Therefore downwardly reflected ray 102 will approach the lower reflecting surface 70' at an angle equal to A–4$d$ from its normal, since this normal at 104 is vertical. Since the angle of incidence at the third reflection from lower surface 70' is equal to A–4$d$, the angle of reflection of reflected ray 106 proceeding in the upward direction will be A–4$d$ relative to all vertical lines. This ray 106 will therefore be incident on upper reflective surface 72' at point 108 in such a manner as to make an angle equal to A–4$d$ with the vertical line (shown dotted) at 110. Let it be asumed that ray 106 impinges on upper reflecting surface 72' along the normal thereto (i.e., the normal to the surface, which is at an angle $d$ to the vertical, is also at an angle A–4$d$, or in other words, A–4$d$ equals $d$, so that A=5$d$). Under such circumstances ray 106 will be rerflected back upon itself when encountering upper reflecting surface 72' so as to retrace its path. By the well-known optical principle of reversibility, such a ray, retracing the path of ray 106, will (upon reflection from surface 70' and 72' alternatively) also retrace paths back along rays 102, 96, 80' and 78' so as to eventually emerge along the direction indicated by arrow 112 back along the original ray path 16".

Thus it may be seen from FIGURE 5 that, if the original central ray from the laser at 16" makes an incident angle A which is an odd multiple of the angle of cant $d$ of the upper reflecting surface, eventually the ray (corresponding to ray 106) incident on the upper reflecting surface, will become coincident with the normal to reflecting surface 72', and will then retrace its path back through the system so as to emerge back along the original entering ray. Thus, since each round-trip reflection will cause the ray to approach being vertical by amount equal to 2$d$ (where the original cant of the surface 72' from horizontal is $d$), we may write for the general formula for each ray that its angle to the vertical will be A–2$id$, wherein $i$ equals the number of reflections from the top surface already made by the ray up until that time. The final or reversing ray (corresponding to ray 106 in FIGURE 5) will occur when A–2$i$=$d$, or (2+1)$d$=A. If we assume that A=$n \times d$ (wherein $n$ in practice is a fairly large odd integer, for example, 75), the formula for computing the number of reflections from the upper surface is obviously:

$$2i_T + 1 = n$$

In this formula, $i_T$ is the total number of (or last) "regular" reflections from the top surface, (i.e., not including the last reversing one) and $$n = \frac{A}{d}$$

For example, in FIGURE 5 wherein $n$ equals 5, $i_T$ equals 2 and corresponds to the first two reflections of rays 78', 96 respectively from upper surface 72', and does not include the last reflection along the normal of ray 106.

It should be noted that for each reflection from the upper surface the beam will traverse back and forth between the two reflecting surfaces a distance approximating the general distance between the two reflcting surfaces, $t$, as shown in FIGURE 5. This approximation becomes quite close if the original incidence angle $A$ is very small (as it is in practice). In addition to these two traversals for each regular reflection from the upper surface 72' (i.e., the traversals corresponding to rays 78' 80', 96 and 102 in FIGURE 5), there will be the last traversal corresponding to the reversing reflection (i.e., that of ray 106) and the very first traversal (ray 16"). Thus the ray will traverse the sample area a distance qual to $(2i_T+2)t$ from the time it enters the sample area (point 77) along ray 16" until it reaches point 108. Thereafter it will retrace the same path, so that the total distance traveled will be approximately $2(2i_T+2)t$. Since the ratio $n$ between the angle made by the incoming beam to the vertical $A$ and the cant angle $d$ of upper mirror 72' equals $2i_T+1$ (or $2i_T=n-1$), it may be seen that the number of passes through the sample area in both a forward and backward direction of the ray will equal $2(n+1)$. Thus the number of passes may be controlled by simply choosing the correct ratio $n$ of the angle $A$ that the incoming beam makes with the normal to the lower horizontal mirror and the small angle $d$ that the upper surface 72' makes with lower surface 70'.

Before considering in more detail the design of a practical sample cell configuration having the general properties of FIGURE 5, a few general observations should first be made: First, it should be obvious that it is immaterial whether the lower reflecting surface 70' is horizontal (i.e., its normal 74' is vertical), as long as the upper surface 72' and the incoming ray 16" are maintained at the same relative angles ($d$ and $A$, respectively) thereto. In other words, the entire FIGURE 5 diagram may be rotated in the plane of its paper in any manner without changing any of the relationships. However, assuming the cant angle ($d$) between the two surfaces is maintained constant, rotation of the incoming beam in the plane of the paper relative to them (or vice versa) will cause a constant change in all of the angles; but each of the angles made by the ray on successive reflections from the two surfaces will still diminish by the same amount (i.e., multiplies of $d$) from the previous one in the same manner as shown in FIGURE 5. On the other hand, if the original angle of incidence $A$ is maintained and the cant angle between the surfaces is changed, then the successive reflections would occur at angles which differed by the same multiples of this new cant angle. That is, the new angles of incidence on successive bottom and top surface reflections would be: $A$, $A-d'$, $A-2d'$, $A-3d'$, $A-4d'$, etc., if the cant angle is changed from $d$ to $d'$. It should also be noticed that the value of $n$ (and, of course, $i_T$) will change if only either $A$ or $d$ alone is varied (in fact, even if $A$ and/or $d$ are both varied in any manner other than that which maintains their ratio constant). Thus changing either $A$ or $d$ alone (or, indeed, varying both in general) will cause changes in the angles of reflection and the total number of such reflections (and therefore the number of traversal paths).

However, before attempting to determine what are the preferred values for angles $A$ and $d$, there are other geometrical characteristics of the sample volume which should be investigated. Perhaps the most important of these is the sample compartment length (i.e., the horizontal dimension in each of FIGURES 2, 3, and 5). Therefore, we must first establish the relationships between this length and the other parameters of the sample compartment geometry.

*Relationships between sample compartment dimensions*

If the horizontal distance between points 77 (representing the entrance point of the original beam into the reflective compartment) and point 79 (which is the point of incidence for the first reflection from the top surface 72') is assigned to value $s$, we may then write from well-known trigonometry:

$$\text{Tan } A = \frac{s}{2t}$$

The second horizontal interval between the point 79 of the first reflection and the point 101 of the second reflection from upper surface 72' is designated $s-a_1$ (see FIGURE 5). From the triangle including points 79 and 101 (bounded by rays 80' tnd 96), the following trigonometric relationship is obvious:

$$\text{Tan } (A-2d) = \frac{s-a_1}{2t}$$

If the horizontal interval between points 108 and 101 is similarly designated $s-a_2$, then it is obvious that:

$$\text{Tan } (A-4d) = \frac{s-a_2}{2t}$$

In fact, assuming that there are many such reflections, as will occur in any preferred embodiment of the invention, we may write the general formula:

$$\text{Tan } (A-2i) = \frac{s-a_i}{2t}$$

If the angle $A$ is very small (in one exemplary embodiment of the invention it is about 2°), the tangent of these small angles may be considered to be equal to the angles themselves. Under such circumstances we may write:

$$A = \frac{s}{2t} \quad (1)$$

$$A - 2d = \frac{s-a_1}{2t} \quad (2)$$

$$A - 4d = \frac{s-a_2}{2t} \quad (2b)$$

and in general, $$A - 2jd = \frac{s-a_j}{2t} \quad (2c)$$

If we subtract the first expression (1) from each of the latter three, (2a), (2b), and (2c), we obtain:

$$2d = \frac{a_1}{2t} \quad (3a)$$

$$4d = \frac{a_2}{2t} \quad (3b)$$

and in general, $$2jd = \frac{a_j}{2t} \quad (3c)$$

Or:

$$a_1 = 4dt \quad (4a)$$
$$a_2 = 8dt \quad (4b)$$

and in general, $$a_j = 4jdt \quad (4c)$$

It is therefore obvious that:

$$a_2 = 2a_1 \quad (5a)$$
$$a_3 = 3a_1 \quad (5b)$$

and in general:

$$a_j = ja_1 \quad (5c)$$

Thus, for a reflective sample cell having many reflections from each of the two surfaces we may write (substituting $a=a_1$):

$$L = (s-a) = (s-2a) + (s-3a) + \ldots \\ + (s-ja) + \ldots + (s-ka) \quad (6)$$

wherein: L is the total horizontal length of the upper reflective surface required; $j$ is any integer smaller than the total number of upper surface reflections, and $k$ is the total number of upper surface reflections (including the last, path reversal one). It may be noted that the upper reflective surface need not exist in the first interval, $s$ (i.e., between points 77 and 79 in FIGURE 5).

Thus:

$$L = \sum_{j=1}^{k}(s-ja) \tag{7a}$$

$$= ks - \sum_{j=1}^{k} ja \tag{7b}$$

or $$L = ks - \frac{k(k+1)}{2}a \tag{7c}$$

Since for the last horizontal interval:

$$s - ka = 0 \tag{8a}$$

$$s = ka \tag{8b}$$

or $$a = \frac{s}{k} \tag{8c}$$

Substituting this last expression (8c) in the final equation for L:

$$L = ks - \frac{k(k+1)}{2} \cdot \frac{s}{k} \tag{9a}$$

$$= ks - \frac{k(k+1)}{2} s \tag{9b}$$

$$= \frac{2k-(k+1)}{2} s \tag{9c}$$

$$L = \frac{k-1}{2} s \tag{9d}$$

It should be noted that $k$, the total number of reflections from the top surface is simply one greater than the total number of "regular" reflections (i.e., nonretracing reflections) previously assigned the symbol, $i_T$. Thus:

$$k - 1 = i_T \tag{10}$$

wherein: $i_T$ = total number of nonretracing reflections from the top surface. Therefore, from (9d) and (10):

$$L = \frac{i_T s}{2} \tag{11}$$

Since, from (1):

$$s = 2tA \tag{12}$$

we have:

$$L = i_T tA \tag{13}$$

Since:

$$2i_T + 1 = n = \frac{A}{d} \tag{14a}$$

$$2i_T = n - 1 = \frac{A}{d} - 1 = \frac{A-d}{d} \tag{14b}$$

or $$i_T = \frac{n}{2} - \frac{1}{2} = \frac{n-1}{2} = \frac{A}{2d} - \frac{1}{2} = \frac{A-d}{2d} \tag{14c}$$

From (14c) we may write (13) in the following alternate forms:

$$L = \left(\frac{n}{2} - \frac{1}{2}\right)tA = \left(\frac{n-1}{2}\right)tA \tag{15a}$$

$$L = \left(\frac{A}{2d} - \frac{1}{2}\right)tA = \left(\frac{A-d}{2d}\right)tA \tag{15b}$$

Since assuming the cross section of the cell is rectangular, the volume, V is (excluding the dead volume at the two ends of the cell):

$$V = Ltw \tag{16}$$

wherein $w$ is the width of the cell (i.e., the shorter dimension across the interior of the cell as seen in FIGURE 3).

Now it is obvious that it is desirable to maintain the volume small, so that small sample quantities may be used, while maximizing the path length of the laser beam. This path length P is given by:

$$P = (\text{number of passes}) \times t \tag{17}$$

or $$P = 4(i_T + 1)t = (4i_T + 4)t \tag{17a}$$

or $$P + 2(n+1)t = (2n+2)t \tag{17b}$$

For values of $n$ or $A/d$, much greater than one (say, fifty or so), so that $n/2$ is at least 25, we may write for (15a) and (15b) the approximate equations:

$$L \approx \frac{n}{2} tA \tag{18a}$$

$$L \approx \frac{A}{2d} tA = \frac{A^2}{2d} t \tag{18b}$$

with only a small (no greater than two percent) error.

Similarly, Equations (17a) and (17b) may be replaced by the following approximations under such conditions with only small error (in this case, no more than four and two percent, respectively).

$$P \approx 4i_T t \tag{19a}$$

and $$P \approx 2nt \tag{19b}$$

or substituting $A/d$ for $n$:

$$P \approx \frac{2A}{d} t$$

*Designing sample compartment*

Since the required L is approximately proportional to $t$ (see 18a) or (18b) above) and the volume is proportional to the product of L and $t$, increasing $t$ will increase the path length only at the expense of increasing the volume at a square rate. Similarly, as may be seen from approximation (19c), increasing the original angle of incidence of the laser beam, A, increases the path length linearly; but approximation (18b) shows this also increases length, L (and therefore the volume, V), at a square rate. Thus, either using a large original angle of incidence of the laser beam (A) or a "tall" cell (i.e., large $t$) will worsen the path-length-to-volume ratio.

If, however, $t$ is changed (say, increased) and at the same time A is changed (say, decreased) in such a manner that their product, $t \times A$ (and therefore S in Equation (12)) remains constant, the value of L will depend on $n/2$ in Equation (18a) or $A/2d$ in Equation (18b). When the product, $t \times A$, is so maintained, we may write:

$$L = \frac{A}{2d} C \text{ and } P = \frac{2}{d} C$$

where C is the same constant, namely, to A. Then, the volume, $$V = w \frac{A}{2d} Ct = \frac{wC^2}{2d}$$

thus, the volume and the path length will be both proportional to $1/d$, and therefore both vary in the same way. In fact, as may be seen from a comparison of Equations (18b) and (19c), varying $d$ alone will always affect L (and, therefore, the volume, V) and P in the same (inverse) manner. Nevertheless, it is obviously preferable to increase the path length, P, by decreasing the cant angle, $d$ (which increases the volume, V, in the same inversely proportional manner as P), than to increase either A or $t$ alone, as noted above.

The deviation of the relationships in the early part of the just preceding paragraph suggests the fact that P is proportional to $t \times A$ and V is proportional to $(t \times A)^2$. Thus discarding the constraint that $t \times A$ is constant, we may easily determine from combining Equations (16) and (18b) that:

$$V = \frac{A^2}{2d} t^2 w = (At)^2 \frac{w}{2d}$$

while Equation (19c) may be rewritten:

$$P = (At) \frac{2}{d}$$

It thus becomes apparent that the ideal solution is to minimize the product $At$, and at the same time reduce $d$ to that value giving the desired path length. As a practical matter, $d$ can be reduced only so low before it can no longer be controlled, so that $At$ must be maintained at a sufficiently high value to allow the path length desired. There is an additional reason why the product, $At$, cannot be reduced below a certain value, proportional to the irradiating beam diameter, as will be explained later. Nevertheless, as will appear hereinafter, $d$ is, in fact, quite small in the preferred specific example, allowing quite small values for A (and, therefore, the product, $At$).

Thus, in order to increase the path length in the most advantageous manner, the smallest practical cant angle, $d$, should be used. The interior width of the cell, $w$, (i.e., the dimension across the cell in the plan view of FIGURE 3) should of course be as small as possible. Thus, this width should be somewhat larger than the width (i.e., cross-sectional diameter) of the laser beam so as to allow the gathering of Raman scattered radiation within the field angle of the collecting optical system (shown in FIGURE 3, and hereinafter more fully explained). The cell height, $t$, should then be chosen so that its image fills the (height of the) entrance slit of the monochromator (see FIGURE 2) for the particular magnification power of the imaging optical system (i.e., lens 22). Although this magnification may be readily changed by choosing different conjugate focal planes of lens 22, the solid angle subtended at the entrance slit should be no larger than the internal optics of the monochromator will collect. In other words, the field cone angles and therefore, the effective speed (i.e., F number) of the external collecting system (lens 22) should match that of the internal monochromator optics. Assuming that the magnification of the lens 22 as used is unity (i.e., plane 120 in FIGURE 2) and the image thereof in the slit formed by jaws 46 and 48 are at equal distances from lens 22), the cell height should approximate or be slightly larger than the slit height, and the F number of lens 22 should be the same as that of the monochromator.

Another practical consideration is the longitudinal distance, $s$, between the entering ray 16 at the mirror plane extended (i.e., point 122 in FIGURE 2) and the point of the first reflection at the upper mirror surface (i.e., point 124 in FIGURE 2). This distance must be great enough to allow substantially the entire width of the laser beam to enter and substantially the entire width of the upwardly reflected beam to be reflected. Looking at the simpler and larger diagram of FIGURE 5, this means that the end point 81 of the upper reflective surface 72′ must be a sufficient distance to the left of the finite width laser beam (exemplified by its central ray 16″) that no substantial part of the entering beam strikes the top of surface 72′ and is thereby lost. Obviously point 81 must be a distance equal to the radius of the laser beam width to avoid such losses. Similarly, point 79 must be at least this same distance to the left of end point 81 in order to avoid loss of any substantial part of the first reflected beam 78′. Therefore, points 77 and 79 must be separated by a distance equal to at least the diameter of the laser beam if the maximum amount of this radiation is to be introduced into and maintained in the cell. Since the distance between points 77 and 79 is the previously defined, $s$, we may write from Equation (1) that $s$ (which is equal to $2tA$) must be at least as large as the laser beam diameter. This sets the lower limit on minimizing the product, $tA$, previously discussed. Since increase of $s$ much beyond this will obviously require a longer cell for the same number of passes (and therefore the same path length), $s$ should be kept just large enough to satisfy the following relationship:

$$s = 2tA = KD \tag{20}$$

wherein D is the diameter of the laser beam, and K is a number larger than 1 but less than, say, 2. In this relationship, K takes care of the raggedness of the right-hand edge (as viewed in FIGURES 2, 3 and 5) of the upper reflective surface and any slight errors in making the incoming laser beam just miss this edge. In one embodiment of the invention actually made (hereinafter described) the laser beam width was just over a millimeter and $s$ was chosen as just under 1.6 mm. It should be noted that once $t$ is chosen, $s$ determines the value of angle of incidence of the incoming laser beam, A.

*Example of sample compartment design*

In this one example of the invention, the following dimensions for the cell were chosen. Since the cell was to be used with a monochromator slit of approximately 12 mm. in height (i.e., the vertical dimension of the slit formed by stationary knife edges 46 and 48 in FIGURE 2), the cell height, $t$, was chosen to be 20 mm. (to allow for less criticality in aligning the cell both vertically and angularly relative to the slit). Substituting this value into Equation (20):

$$s = 40A \tag{21}$$

For a longitudinal distance, $s$, of 1.575 mm. between the center of the incoming laser beam (at the height of the upper reflective surface) and the center of the beam at the point of its first reflection from this upper reflective surface, Equation (21) becomes:

$$1.575 \text{ mm.} = (40 \text{ mm.}) \tag{22a}$$

or $$A = \frac{1.575}{40} = 0.0394 \text{ radians} \tag{22b}$$

or $$A = 2\tfrac{1}{4}° \tag{22c}$$

If we wish a total path length of, say 3⅛ meters, we shall need approximately 156 total passes between the upper and lower reflective surfaces (which are 20 mm. apart). That is, from Equation (17):

$$P = (\text{number of passes}) \, Xt \tag{17}$$

$$P = (156)(20 \text{ mm.}) = 3.12 \text{ meters} \tag{23}$$

Equating these values to the path length given by Equation (17b), we obtain:

$$P = (2n+2)t = 156t \tag{24}$$

Thus:

$$2n + 2 = 156 \tag{25}$$

or $$2n = 154 \tag{25a}$$

or $$n = 77 \tag{25b}$$

Since:

$$n = \frac{A}{d} \tag{26}$$

we have:

$$d = \frac{A}{n} \tag{26a}$$

Substituting the above values for A and $n$, $$d = \frac{0.0394}{77} \text{ radians} \tag{27}$$

or $$d = 0.00051 \text{ radians} \tag{27a}$$

or $$d = 1\frac{3}{4} \text{ minutes} \tag{27b}$$

Setting forth Equation (15a) and substituting values:

$$L = \left(\frac{n-1}{2}\right) tA \tag{15a}$$

$$L = \left(\frac{77-1}{2}\right)(20)(0.0394) \tag{28a}$$

$$L = (760)(0.0394) \tag{28b}$$

or $$L = 30 \text{ mm.} \tag{28c}$$

Thus, for a cell of height $t$ of 20 mm., the length of the dielectric reflective surfaces L should be 30 mm. for a cant angle $d$ of 1¾ minutes therebetween and an angle of incidence A of the laser beam of 2¼°. For this exemplary cell, there will be 78 one-way traversals of the cell by the beam until it reaches an angle of incidence on the upper reflective surface of 1¾ minutes; the beam then reverses its path and makes another 78 traversals before emerging from the cell along the same path it originally entered (but, of course, in the opposite direction). Before reaching the reversing reflection (at the left-hand end of the upper reflective surface), there will be 38 "regular" reflections from this upper surface (thus, $i_T = 38$) and 39 reflections from the lower reflective surfaces. On the return trip there will, of course, be the same number of reflections again (38 top and 39 bottom). There are therefore 78 total bottom reflections, 76 "regular" top reflections, plus the one reversing top reflection. Each of these 155 reflections causes one traversal of the cell and there is in addition the very first traversal of exterring ray 16 (or 16″ in FIGURE 5), making the total traversals 156.

The last reflection will occur at the end of the reflective surfaces, so that increasing the original laser beam angle of incidence above the ideal 2¼° for this particular geometry will only cause the beam to go out of the other end of the cell (in a manner analogous to ray 82 in the FIGURE 4 parallel wall cell), and thereby reduce the efficiency by one-half. On the other hand, decreasing the laser beam angle of incidence will cause the beam to make its reversal reflection before reaching the end of the reflective surface and before the maximum number of "regular" reflections have occurred. Because the laser beam may actually be seen in the sample cell when a liquid is present, the entire cell (or alternatively the laser or a directing mirror) may be tilted slightly to cause the incoming beam to make the exact angle of incidence required, by observing where the last reflection takes place. Thus, the last reflection may be gradually moved to the end of the reflective (say) top surface. Increasing the original incidence angle too much is readily recognized by the fact that the laser beam leaves the far end of the cell.

It might be noted here that approximate Equation (18a), (18b), (19a), and (19c) may be used with only a few percent error (at most) for $n$ being at least 50 or so (77 here). Thus, using Equation (18b) and substituting the final cell dimensions:

$$L \approx \frac{A^2}{2d} t \tag{18b}$$

$$30 \approx \frac{A^2}{2(5.1 \times 10^{-4})} 20 \tag{29a}$$

$$A^2 \approx 3(5.1 \times 10^{-4}) = 15.3 \times 10^{-4} \tag{29b}$$

$$A \approx 3.91 \times 10^{-2} = 0.039 \text{ radians} \tag{29c}$$

$$= 2°14' \tag{29d}$$

Finding $n$ for this value of A, $$n = \frac{0.0391}{0.00051} = \frac{391}{5.1} \tag{30a}$$

$$n = 77 \text{ (nearest integer)} \tag{30b}$$

Using approximate Equation (19b), $$P \approx 2(77) \, 20 \text{ mm.} \tag{31a}$$

$$\approx 154 \text{ passes of 20 mm. each} \tag{31b}$$

$$\approx 3080 \text{ mm.} = 3.08 \text{ meters} \tag{31c}$$

Thus, angle A and the total path length computed with the approximate equations are both within 2% of their more exact early given values, illustrating that the simpler equations may be used for most practical problems.

*Collection of Raman radiation*

Assuming that the contents in the interior of the sample compartment 52 are irradiated by the laser beam in the manner described, it will be seen that the sample therein will produce Raman scattered radiation at a multitude of points throughout the sample volume. In particular, if the laser beam 16 in FIGURE 2 actually makes 156 passes through the cell (78 in one direction, till it reaches the left-hand end of the cell and then reverses to make an additional 78 passes), there will be either 78 or 156 (depending on whether the retrace is substantially exact or not) lines along which the molecules in the sample may radiate Raman energy. Because these lines of irradition become closer and closer together as the left-hand end of the cell or sample compartment is approached, the plane of best focus for gathering as much of this scattered radiation as possible actually will not lie halfway between the left and right-hand end of the cell, but rather will be substantially to the left of midpoint. The plane is therefore indicated by dotted line 120 as lying considerably closer to the left-hand end than to the right-hand end of the cell.

The exact position of the point of best focus may be obtained (for transparent samples) by conventional statistical analysis, utilizing, for example, the technique of minimizing the root mean square variation to find the best position for the focal plane of lens 22 (i.e., plane 120). For samples which absorb the laser beam (so that it is of less intensity at the left-hand end of the cell), the plane of best focus may be most readily found empirically. Upper ray 132 and lower ray 134, represent the cone of acceptance of lens 22 with reference to the best focal plane 120. Thus all the rays leaving the vicinity of plane 120 between 132 and 134 (and not crossing either of these rays as they continue in the right-hand direction) will be gathered or collected by lens 22 so as to present these collected rays (as represented by outer rays 136 and 138) to the slit formed by stationary knife edges 46 and 48 in FIGURE 2. Any other Raman scattered rays from other parts of the irradiated sample in compartment 52 will be collected by lens 22 and presented to the monochromator slit, if they are included within the cone angle of rays 132 and 142 and remain within the cone angle of rays 136 and 137.

In order to double the effective amount of scattered radiation collected a backing or return concave mirror 140 is provided a the left-hand side of the sample compartment. Concave mirror 140 has a reflective coating at 142, preferably of the same type of multilayered dielectric material previously described. The radius of curvature of concave mirror 140 is chosen so that it is equal to the distance between the center of the mirror (at point 144) and the center of the plane of best focus 120 of lens 22, so that rays from plane 120 striking mirror 140 will be returned to the same point in plane 120 from which they originated. For this reason scattered radiation traveling to the left will be reflected back by concave mirror 140 along directions within the acceptance angle of lens 22, if the original direction of these rays to the left was also within this same central angle (but of course in the wrong direction). Therefore the combination of concave return mirror 140 and lens 22 will cause collection of all scattered Raman radiation that is traveling generally in a horizontal direction, either to the left or the right in FIG- URE 2. More specifically, those rays which are within the acceptance angle defined by rays 132 and 134 of lens 22 and those rays which are within a similar acceptance angle but travelling in an opposite (i.e., left) direction will be collected by lens 22 so as to be presented to the monochromator slit at the right. To represent which of the back rays (i.e., those travelling toward the mirror 140) are returned to the monochromator slit (i.e., are within the angle accepted by lens 22), the two extreme rays of acceptance 146 and 148 are indicated at the left-hand side of FIGURE 2.

The Glans-Thompson prism 26 (or other polarizing prism) is positioned in the collected radiation, exemplified by the extreme or outer rays 136, 138, whenever depolarization measurements are to be made. To indicate the fact that this polarizing prism may be removed except when such measurements are being made, polarizing prism 26 is shown in dashed lines. As indicated by the dashed arrow 27, prism 26 is rotatable about the optical axis (i.e., the horizontal line in FIGURE 2 through the center of lens 22) of the entire system so as to allow the plane of polarization of the prism to be rotatably positioned at any angle relative to the horizon. The fact that a laser beam is extremely well polarized (by the use of end windows at Brewster's angle on either side of the cavity in which occurs the maser action creating the beam 16) and the fact that the sample is illuminated by a beam which is travelling in substantially the same direction (i.e., substantially vertically in FIGURE 2) allows the polarization measurements to be performed under conditions approaching the ideal. Since the optical maser (laser) may be rotated about its own optical axis, the plane of polarization of the exciting radiation may be varied independently of the plane of polarization of the analyzing polarizer prism 26. In this manner any preferred geometry may be effected for various depolarization measurements.

FIGURE 3 is a horizontal section through the same parts of the apparatus as shown in FIGURE 2. Since the irradiating laser beam entering into the plane of the paper in FIGURE 3 is relatively narrow in diameter, the width of the cell (i.e., the vertical dimension in FIGURE 3) may be advantageously made quite narrow. In addition since the normal width of the horizontally adjustable slits 150 and 152 is usually quite narrow (for example, 0.2 millimeter), the angle of acceptance of the optical system actually utilized in this plane is relatively narrow. This does not mean that lens 22 need be cylindrical, toroid or any other asymmetrical shape; rather it means only that the angular extent of the beam collected at the conjugate focal plane 120 will be narrower in this plane because of the narrower slit dimension as seen in FIGURE 3. Since the resolution of the monochromator varies inversely with the width of the slits, adjustable slit jaws 150 and 152 cannot advantageously be separated more than a certain distance without losing the ability to distinguish between closely adjacent spectral lines or bands. For this reason (as is well known in the spectrometer art) the slits 150 and 152 must not be separated further than a certain opening for the particular desired spectral resolution. The magnification of the optical system 22 (in this case illustrated as substantially one) should be chosen so that the parts of the sample irradiated by laser beam 16 at least fill the width of the slit between jaws 150 and 152 when they are at their maximum setting.

In the specific embodiment actually made, the laser beam was approximately one millimeter in diameter and the maximum slit width between jaws 150 and 152 was approximately 0.4 millimeter, with lens 22 being positioned with its conjugate focal plane 120 on its left and the corresponding conjugate focal plane at slit 154 on it right equidistant from the lens (i.e., a magnification of 1). Because of the much narrower dimension of adjustable slits 150 and 152 (i.e., the width of the monochromator slit) relative to the fixed knife edges 46 and 48 in FIGURE 2 (i.e., the height of the monochromator slit), the extreme rays in the horizontal plane (FIGURE 3) 156 and 158 that are collected by lens 22 (to form a beam bounded by extreme rays 162 and 164) will make a much narrower beam than the beam in the vertical plane (rays 134, 136 in FIGURE 2). Since the conjugate plane 120 of slit opening 154 (FIGURE 3) is at the same longitudinal position as the equivalent conjugate plane (120) in FIGURE 2 (being in fact the same plane seen on edge), backing mirror 140 will also have its center of curvature in the center of this plane 120 in FIGURE 3. For this reason all of the rays leaving the plane at 120 toward the left will be returned by the reflective surface 142 of backing mirror 140 to the same point in plane 120 from which they originated. Thus in the horizontal plane also backing mirror 140 has the desired effect of doubling the amount of collected Raman scattered radiation that is presented ultimately to the monochromator slit at 154, by returning the back beam between rays 166 and 168 to the monochromator slit.

Thus, as may be seen from FIGURES 2 and 3, that Raman radiation will be collected which is emitted by the irradiated parts of the sample in directions substantially at right angles to the direction of the irradiating beam (i.e., the scattered radiation along the longitudinal axis of the sample compartment, which axis is horizontal in both FIGURES 2 and 3). Because of this geometry, relatively small amounts of the laser beam which are merely reflected by the transparent or reflective surfaces of the solid material making up the sample cell will be collected, since in general any such extraneous reflections will tend to be primarily in upward and downward directions in FIGURE 2 (i.e., mostly in the direction of the original laser beam). Even more important is the fact that much of the regular (i.e., non-Raman) scattered radiation will also be eliminated by the particular technique of collecting the Raman radiation. Thus Rayleigh and Tyndall scattered light will, in general, not enter the monochromator (although of course some amounts will) thereby increasing the signal-to-noise ratio of the radiation ultimately reaching the detector.

Alternative sample cells

Although the specific embodiment illustrated in FIGURES 2 and 3 utilizes a sample cell (i.e., a unitary structure for holding the sample), in which the reflecting surfaces for the irradiating laser beam are formed directly on the inner walls of two opposing faces thereof, it is obvious that this particular structure is not essential to the invention. Thus where the upper and lower transparent plates forming the cell 18 are either relatively thin or extremely transparent to the wave-length of the laser beam, the reflective surfaces 54 and 56 may be placed on the outside of these surfaces rather than the inside. One disadvantage of such placement is of course that the somewhat reflecting interface between the liquid sample and the transparent material of the cell walls will cause some reflection losses in a direction away from the cell interior. Also the laser beam will then pass through the material forming these plates each time it traverses the sample volume, so that any absorption thereof by the material of the sample cell would tend to have a highly accumulative effect. However, if the cell material has an index of refraction approximating that of the liquid sample and is extremely transparent (i.e., virtually zero absorption) at the particular frequency of the laser beam and/or is quite thin, these disadvantages may be only theoretical rather than real. The advantage of such placement of the dielectric reflective coatings 54 and 56 is of course that they are thereby removed from any deteriorating effect of the sample and/or solvent which may be contained in the cell. In fact, since the reflective material would then be acting as a backing rather than the front surface type of reflector, it would also be somewhat less sensitive to abrasion since a protective layer could be placed thereon, which layer alone would be subject to abrasion (on the outside).

If the reflective surfaces are so placed on the outside of the sample cell, both surfaces of the upper and lower plates of the sample cell should be made extremely smooth (i.e., optically polished) so as to minimize light losses. It should be noted of course that even when the reflective coating is on the inside of the surface, the inner surfaces 53 and 55 of the upper and lower plates 50, 51 should be highly polished since they will affect the smoothness and uniformity of the layers of dielectric material making up the reflective coatings 54 and 56. If the reflective coatings are on the outside of the plates, not only must both surfaces of each of the upper and lower plates be smooth, but these surfaces should also be essentially parallel to each other in order to avoid any wedge effect which may cause the traversing laser beam to be deviated from the path desired. Alternatively an intentional controlled wedge effect may be introduced into the top and/or the bottom plate so as to cause, in conjunction with any cant angle between the reflective surfaces, the desired effect illustrated. In other words, any wedge effect of these plates may be utilized to either augment or to partially compensate for too much or too little angle between the two reflective surfaces. Because of the fact that the actual angles involved are so small, however, it will usually not be until the entire cell has been assembled that the cant angle between the reflective surfaces (and any wedge effect of the upper and lower surfaces) will be fully determined. In fact if the reflective surface is positioned on the inside of the top and bottom plates as shown in FIGURE 2, it will usually be the cementing of the cell parts together which will determine the actual wedge angle between these two reflective surfaces. Thus one technique for forming the desired wedge angle is merely to utilize slow setting cement in forming the cell from component parts (including separate top and bottom plates) and adjusting the angle between the top and bottom plates (and therefore the reflective surfaces) as the cement hardens. The cant angle between the two reflective surfaces may of course be accurately measured by utilizing an optical lever principle to determine the angle between the two surfaces, or alternatively the cell may be actually tested by means of a traversing beam in the manner in which it will be ultimately used to determine the number of reflections made for a given angle of incidence. From this the cant angle could be easily computed as herein fully described.

A further alternative construction, more or less corresponding to that shown in FIGURES 2 and 3, would be the utilization of a cell or sample holder 18 which is wholly transparent (at least as to its top and bottom and two end plates), and two slightly canted reflective surfaces supported on means outside of the cell itself. In other words, the reflective surfaces 54 and 56 would not be formed on the cell at all, but rather on plates that were outside of the cell, namely, one above and one below the cell as shown in FIGURE 2. The advantage of such an arrangement is to allow the manufacture and use of less expensive cells (since the cells would have no reflective coatings), and the fact that the instrument could be adjusted for the desired angle of incidence of the laser beam on the reflective surfaces without being affected by change of cell. The disadvantages are essentially the same as with exterior reflective coatings, but in addition there will be an additional (second) reflection loss at the outer surface of the cell walls. If this is a, say, glass-to-air interface, such losses would be considerable unless the interface is specially coated to reduce reflection losses (which in turn increases cell cost again).

*Adjustments by the operator*

Since all of the various dimensions of the cell (including not only the length, L, the height, t, but usually also the angle of cant, d, between the two reflective surfaces) are constant, once a particular cell has been made for a specific spectrometer, the only variable that is under the control of the operator in setting up the instrument is the angle of incidence, A, of the laser beam on the bottom reflective surface of the cell. If the sample holder is of the FIGURES 2, 3 and 5 type, this angle A may be adjusted either by rotating the entire cell slightly, or else by tilting the laser beam (by angularly moving either the laser itself or an intermediary mirror or the like). Such a variation of the original incidence angle A of the laser beam does not change the fact that each succeeding reflection from each of the canted surfaces will occur at an incident angle which is less by the cant angle, d, from the just previous one. Assuming that the original incident angle, A, is sufficiently small that the reflected beam does not escape from the other end of the cell (in a manner somewhat analogous to FIGURE 4), the successive angles of incidence of the beam will eventually approach zero. The reflected beam thus "walks" across the cell (from right to left) with ever decreasing "steps," as may be seen in FIGURE 2 or FIGURE 5. If the successive angles of incidence finally reach exactly zero (see FIGURE 5 at point 108), the beam will be reversed on itself and return along exactly the same path, the successive "steps" of the walking now becoming ever greater (by an amount measured by the addition of d to each succeeding incident angle).

If on the original (i.e., right to left) "trip" the reflected beam encounters a surface at an angle of incidence greater than zero but less than d, a slightly different result occurs. In this case, the next incidence of the beam on the other reflective surface will be on the other side (i.e., on the left) of the normal to that surface (i.e., a "minus" angle of incidence). The beam therefore will start "walking" back to the right, but along a different path than that of the original trip (from left to right), by being reflected at points between those originally encountered. The return "steps" will, of course, increase in essentially the same manner (i.e., by d), and each return step will be similar to (although slightly different from) the corresponding original step. In particular, each return step will have an apex (incident) angle which is constantly different (by a constant fraction of d) from the corresponding original step. The overall result is for the return trip to be along a somewhat different (criss-cross) path from the original, but with an equal (or at most different by one) number of similar steps or traversals.

The operator would, therefore, adjust the original angle of incidence, A, of the irradiating beam until the last "step" reflection occurs very near the opposite end (i.e., left end in FIGURES 2, 3 and 5) of the cell. A too large angle A is easily recognized by the beam escaping from the left-hand end of the cell (i.e., near points 60 or 62 in FIGURE 2). Therefore, angle A is adjusted to a value slightly smaller than that which occasions this loss, so as to maximize the number of traversals obtained for the particular geometry of the cell used. The entering beam should also be laterally adjusted so that it clears the upper reflecting surface upon entry but fully falls upon the lower reflective surface (as shown in both of FIGURES 2 and 5). Since the beam has finite diameter, this adjustment is not as trivial as suggested by the diagrams of the drawing, but is still easily obtained by watching for any (unwanted) upper surface reflection upon entrance (i.e., adjacent point 124 in FIGURE 2) and any escape of the beam just to the right of the right-hand end of the lower surface.

*Alternatives: Reflective surface having positive dioptric power*

An alternative embodiment of the invention, particularly suitable for use with an exciting irradiating beam which has some tendency to diverge, is shown in FIGURE 6. This vertical sectional view shows that the different embodiment of the sample cell 18' of FIGURE 6 may have many identical parts to the sample cell 18 shown in FIGURE 2. For this reason those parts which correspond exactly to the FIGURE 2 cell are labelled with identical reference numerals, while those parts which differ but are analogous to the parts of the cell of FIGURE 2 are labelled with similar but different reference numerals. Thus the FIGURE 6 sample cell 18′ comprises the same upper plate 50, having a reflective surface coating 54, the same left and right end plates, 68 and 69, and the same sample inlet tube 61. The lower wall 251 of sample cell 18′, however, differs from that of the FIGURE 2 sample cell, in having a spherical interior surface 255, so that the reflective coating 256 thereon also has a spherical upper surface. Although this lower wall 251 of sample cell 18′ is shown as composed of a curved plate having more or less equal curvature on both sides, it is obvious that the lower surface of plate 251 may have any desirable shape as it is only the upper surface 255 which effects the shape of the reflective coating 256. Of course if the reflective coatings are positioned on the outside (i.e., the bottom surface of plate 251), then the shape of this lower surface is no longer immaterial but rather will determine the shape of the reflective coating and should therefore be, for example, spherical.

The irradiating beam, represented by its central ray 316, appears in FIGURE 6 to be substantially the same as the collimated beam 16 of FIGURE 2. However, the embodiment of the cell in FIGURE 6 is particularly adapted for use with an irradiating beam 316 which in fact is not collimated, but rather includes rays that diverge somewhat from the central ray illustrated. Because of the difficulty of illustration, such divergence of beam is not shown in FIGURE 6, the fact that this beam is different from the completely collimated beam of FIGURE 2 being conveyed by the use of a different reference numeral therefor. However, FIGURE 7, which is an end elevation taken on lines 7—7 in FIGURE 6, illustrates that the rays in beam 316 are not parallel.

In FIGURE 7 the lack of collimation of the beam, indicated generally at 316, is illustrated on the assumption that the beam is focused to a very small area at point 260 (which point is indicated in FIGURE 6 also). Thus the beam as it enters the cell is assumed to be composed of a converging cone of light bounded by outer rays 262 and 264, which rays diverge from point 260, as illustrated by their continuations 262′ and 264′. It should be remembered that the beam, as represented by the central ray, actually travels some distance right to left, as viewed in FIGURE 6 between each reflection from the upper and lower reflective surfaces, 54 and 256. This will naturally occur because of the original angle of incoming beam 316, and may also be controlled by a small angle of cant between upper reflective surface 54 and curved lower reflective surface 256 (the latter being represented by a plane tangent to its midpoint, which plane is therefore perpendicular to its radius at its center). For this reason the rays in FIGURE 7 will, upon successive reflections from the top and bottom reflective surfaces, travel deeper and deeper away from the plane of the paper in FIGURE 7, (i.e., away from the observer).

If the lower reflective surface were a plane, the diverging beam in FIGURE 7 bounded by rays 262′ and 264′ would of course continue to spread as it was reflected back and forth between the upper and lower surfaces (and would generally proceed down the length of the cell in the manner illustrated by the central ray of FIGURE 6, and noted just above). Thus in the end view of FIGURE 7 the left-hand bounding ray 264′, if reflected from a plane surface at the bottom of the cell, would be reflected upwardly in a direction to cause it to strike very near the left-hand edge (as viewed in FIGURE 7) of the upper reflective surface 54. The effect of using a concave curved reflective surface at 256 on the divergence of the beam 316 is illustrated for the lateral plane in FIGURE 7, but actually the effect will be similar in the longitudinal plane (i.e., the plane of the paper in FIGURE 6). Because of the concavity of lower reflective surface 256, ray 264′ will meet this surface at point 266, at which the normal to surface 256 is not exactly vertical (as it would be if the lower reflective surface were a plane), but rather is tilted somewhat clockwise from verticality and viewed in FIGURE 7. In particular this normal will of course pass through the center of curvature of the curved reflective surface 256. Therefore reflected ray 268 does not make as great an angle on the other side of the vertical as incoming ray 264′ did (since the incident ray 264′ and reflected ray 268 obviously make equal angles relative to a normal which is tilted relative to the vertical.

Ray 268 will then be reflected at upper surface 54, the normal to which is exactly vertical, so as to return as ray 270 to the lower reflective surface. Because upper reflective surface 54 is horizontal (so that its normal is vertical), ray 270 will impinge on the reflective, curved surface 256 at an angle, as measured from the vertical, which is equal to the angle (as measured from the vertical) of ray 268. Because the normal to the lower reflective surface 256 at the point of incidence 272 of ray 270 is tilted clockwise relative to the vertical (in fact, is tilted more than the normal to point 266, a well-known characteristic of spherical surfaces, wherein the normals all pass through the center of curvature), the reflected ray 274 will make a lesser angle to the vertical than the incident ray 270 did. In fact, as an illustrative example, it is assumed that the normal to point 272 makes the same angle with the vertical as does ray 270 with the normal; in other words, it is assumed that the normal bisects the angle between ray 270 and the vertical. Under such circumstances, since ray 270 and reflected ray 274 will make equal angles relative to the normal, ray 274 will be travelling upwardly exactly along the vertical. Therefore ray 274 will be incident at point 276 on upper reflective surface 54 at a zero degree angle of incidence. Upwardly directed ray 274 will therefore be reflected back upon itself as indicated by return arrow 277, and, because of the well-known principle of reversibility, will retrace (as seen in two dimensions) the paths successively of rays 270, 268 and 264′ after alternate reflections from the two reflective surfaces 54 and 256.

As previously pointed out, the actual paths of these rays will be somewhat different than would appear from viewing them from a single plane, such as represented by FIGURE 7. Since the rays in addition to making changing angles after each reflection (as represented in FIGURE 7) are also travelling away from the observer as viewed in this figure (see the side view of FIGURE 6), the ray upon being returned eventually to a path similar to that shown at 264′ (but in the opposite direction) will actually encounter the upper reflective surface 54 at a point deeper in (i.e., behind the plane of) the paper than represented by point 260 in FIGURE 7. A glance at FIGURE 6, in which the points of reflection at the lower surface at 266 and 272 are labelled, will show that the reflection subsequent to point 276 is not back at point 272, but is actually at a point 278 further along the cell. Similarly, the second lower reflection in the return path will not be at point 266 (as implied by the necessarily two-dimensional view of FIGURE 7), but rather will be deeper into the cell as represented by point 280 in FIGURE 6, so that the return to the lateral center of the cell of the ray will be on a point such as 282, rather than at point 260 as would appear from FIGURE 7.

Once the ray has been reflected back so as to impinge along the longitudinal center line of the cell (i.e., along a ray path in the same plane as but behind the reversed ray path of ray 264′ shown in FIGURE 7), the ray will be reflected at the upper central point (282 in FIGURE 6, directly behind point 260 in FIGURE 7), so as to thereafter travel in a path represented by ray 262′. Actually of course the return ray from the left-hand rays represented in FIGURE 7 will not really be along ray path 262' of the original ray 262, but rather will really be behind 262' (i.e., in a plane containing 262' and perpendicular to the paper of FIGURE 7). Both original ray 262' and the fully returned ray just previously described will therefore be reflected in a manner represented by ray path 288, 290 and 294. These ray paths are exactly symmetrical to the previously described ray paths 268, 270 and 274 for the left side of FIGURE 7. Since the normals to the lower surface at points 286 and 292 make the same angle with the vertical, but are on opposite sides thereof (i.e., are tilted counterclockwise relative thereto) as the normals at points 266 and 272, respectively, the various angles made by rays 288, 290 and 294 relative to both the vertical and the normals will be identical to that described for the left-hand ray path, the only difference being that the angles will be in the opposite sense. For this reason ray 294 will be along the vertical normal to upper reflective surface 54, and will therefore be returned thereby as represented by the return arrow 297, so that the return ray retraces in the opposite direction ray paths 294, 290, 288 and 262'. It should be noted that points 286 and 292 at the right-hand side of FIGURE 7, if representative of the points of reflection for the original ray 262, 262' will be directly behind points 266 and 272 in the side view of FIGURE 6; but will appear at points considerably to their left in FIGURE 6 if they represent the points of reflection of return rays from the original ray 264 (i.e., start at point 282 rather than point 260 in FIGURE 6).

Thus, as viewed in FIGURE 7, the outermost ray 264 traces a path represented by rays 264', 268, 270, 274 and then retraces these just mentioned ray paths back along (actually behind) them to behind point 260. Reflection causes the ray to then travel along a path represented by (but behind) ray 262' and along (but really behind) ray paths 288, 290 and 294; subsequent reflection at point 296 will make the ray then retrace back along ray paths (behind) 294, 290, 288, until the ray is retracing a path like, but behind, ray 262'. Obviously this process will then continue with the ray then starting on a ray path which is represented by ray 264' (but will actually be relatively far behind it in FIGURE 7), so as to continuously retrace a similar round trip path. Stated in conventional optical terms, what is occurring (neglecting the angles that are not contained in the plane of the paper in FIGURE 7) is merely that the diverging beam represented by its two extreme rays 262 and 264 is made less and less diverging by a plurality of reflections from the concave lower surface 256 (as represented by the final parallelism of the vertical end rays 274 and 294), is then returned repeatedly back to mirror 256 so as to be gradually converged more and more by additional reflections therefrom, so as to finally focus at a point represented by point 260. This point image is then reflected back at the lower reflective mirror 256 so as to cause the entire process to repeat again.

It is therefore obvious that the number of reflections from the concave lower surface necessary to collimate the light will be dependent upon the radius of curvature of lower concave reflective surface 256 and by the amount of divergency of the original beam. In other words, as is well known, it is the position of the crossing point 260 and the radius of curvature of the concave mirror 256 which will determine when the light first becomes collimated. In conventional use of a concave spherical mirror, the rays from the object strike the mirror only once, and therefore the position of the object and of the radius of curvature of the mirror determine where (if anywhere) a real image of the object is formed. In a system such as represented by FIGURE 7, however, the spherical mirror is presented repetitively with rays from the object in such a manner that it is its accumulative effect thereon that determines the position of the real image. In other words, rays leaving point 260 will strike lower reflective surface 256 at points such as 266 and 272 before collimation and then similar points again (a total of four reflections from lower surface) before they are re-imaged back on point 260.

Obviously the illustration of FIGURE 7 is purely exemplary and the relative power of reflective surface 256 (determined by its radius of curvature) and the actual degree of divergency of the beam (measured, for example, by how far its image 260 is from the mirror) may be varied more or less at will to determine the desired effect for the particular conditions. The important fact concerning such a system is that the curved lower reflective surface 256 will maintain a diverging beam (as represented by rays 262' and 264') from continuously spreading as it is passed many times back and forth through the sample area (as represented by FIGURE 6). In particular the purely exemplary device of FIGURE 7 illustrates that the beam is allowed to spread only through, say, four one-way trips to the cell before it becomes collimated, so that the beam width is no greater than four times the width represented by the difference between points 266 and 286. In fact, since the beam spread is diminished (i.e., the amount of divergency is decreased) after each reflection from the concave mirror 256, the full lateral diameter of the beam at its greatest (represented by rays 274 and 294) is substantially less than four times its width at the first reflection.

If it is remembered that the number of one-way passes through the cell may be on the order of 150 (or even more, of course), it may be readily seen that the use of a concave lower surface in a diveraging beam greatly enhances the concentration of the beam after it has made a few passes to the cell. In other words, if the lower surface in FIGURE 7 were plane, the beam width would have spread throughout the cell in perhaps two, or at most three, one-way reflections, and subsequent reflections would cause substantial losses of the beam out of the cell. Thus after 150 one-way passes the beam would be 150 times as wide as at the bottom of the first pass (corresponding to the distance between points 266 and 286 multiplied by 150), so that substantially all (or more explicitly all but about $\frac{1}{75}$) of the light would be lost by the time of the last pass. The curved surface of FIGURE 7 allows all of this light to be maintained constantly within the cell after any number of passes. As a practical matter the amount of divergency, the location of its plane of divergency and the minimum width of the beam, and the width of the cell (or more particularly, the width of the desired part of the cell which should be irradiated) will determine the desired radius of curvature of the concave surface. The exemplary embodiment of FIGURE 7 will maintain the width to a maximum of approximately twice that of the original width after only one pass to the cell, an improvement factor of 75. If the radius of curvature of the cell were to be chosen equal to the distance between the point of convergency (exemplified by point 260), then the beam width could be maintained between rays 262' and 264', since these rays would then strike such a highly curved mirror along its normal. However, since in most practical examples the amount of divergency would be quite small, and the image would normally be formed at some distance outside of the sample compartment area, relatively slight curvature would normally be utilized on the lower reflective surface 256. In fact, since laser beams may be collimated to extremely small divergence, the actual curvature of mirror 256 will be in substantially all practical cases extremely small. Thus, even where the laser is utilized in a so-called multimode, the reflective surface 256 will almost invariably have much less curvature than exemplified in FIGURES 6 and 7, the curvature being therein exaggerated for purposes of illustration and explanation.

The important practical situation is not divergency of the beam from a very small area image (i.e., a point source) as shown in FIGURE 7, but rather slight divergency from a source (or image thereof) having a finite appreciable area (i.e., an extended source). In such cases, slight curvature of the lower reflective surface will maintain much of the radiation within a relatively narrow beam even after many round trip reflections. For example, a laser used in a multi-mode may act as a source having a plurality of small (i.e., substantially point) sources spaced apart somewhat (so as to approximate a discontinuous extended source). Curving the, say, bottom reflective source may then accomplish a substantial saving of radiation, which would otherwise be lost during the many back and forth traversals of the cell volume, even though the radius of curvature (and the lateral position of the center of curvature) of the concave lower reflector may have to be chosen at a comprise value to best compensate the average divergency (and position) of the various component parts of the laser beam. Similarly, spreading caused by diffraction phenomena of an otherwise regular (say, perfectly parallel) laser beam may be at least partially compensated by extremely small survature (i.e., figuring) of one (or both) of the reflective surfaces.

*Use of total internal reflection surfaces*

A different modification of the FIGURE 2 and 3 cell is shown in FIGURES 8 and 9. FIGURE 8 is a vertical section, or sectional side view of the modified cell, which corresponds generally to FIGURE 2. In FIGURE 8 the two transparent end walls or faces of the cell are shown at 68′ and 69′, since they may differ slightly as to size relative to the corresponding faces 68 and 69 in FIGURE 2. The primary difference between the FIGURE 8 cell and that of FIGURE 2 is that the upper and lower reflective surfaces 54 and 56 of FIGURE 2 are replaced by two prisms 300 and 302. These prisms are cemented or otherwise fastened in a liquid-tight manner to end plates 68′ and 69′ and side plates 304 and 306 (as best seen in FIGURE 9). As may best be seen in the end sectional view of FIGURE 9, prisms 300 and 302 may each be isosceles right angular prisms, the right angle vertex of prism 300 being directly over the center of the cell, and the right angle vertex of prism 302 being directly below the center. On one of the upper outside slanting surfaces 308 of prism 300, a small right angle prism 310 is placed, having its right angle at vertex 312 (see FIGURE 9). The hypotenuse surface (at 318) of small right angle prism 310 is attached to the sloping surface 308 of prism 300, for example, by means of optical cement. Because of this relationship, small prism 310 will have a horizontal upper surface 314. As may be seen by comparison of FIGURES 8 and 9, it is this small upper surface 314 of small prism 310 which is utilized to receive the irradiating beam represented by ray 16 (which beam is preferably a well-collimated laser beam, as in FIGURE 2).

As may be seen in FIGURE 9, the laser beam 16 will therefore pass through the upper surface 314 of small prism 310 and then through the cemented surfaces at 318 of prism 310 and 300, so as to enter prism 300 along the path indicated at 316. The ray will therefore continue along this path 316 through the sample in the interior of the cell at 352 after passing through the lower surface 320 of prism 300. The ray will then enter the upper flat surface 322 of lower prism 302 and proceed therethrough along the path indicated at 324. Upon encountering the inside of the surface 326 of the lower prism 302 at 328, ray 324 will be totally internally reflected along ray path 330. This will occur if (as will be the case) ray 324 makes an angle of incidence on surface 326 which is greater than the critical angle. Since this angle of incidence is 45° in the illustrated embodiment, prism 302 (and prism 300) should be made of material having a sufficiently high index of refraction that the critical angle for the particular wave length of radiation is less than 45°. If this relationship is satisfied, all of the radiation travelling along ray 324 will be reflected at point 328 so as to proceed along ray path 330. Ray 330 will encounter at point 332 the other sloping surface 334 of prism 302. Since ray 330 will make an angle of incidence of 45° (greater than the critical angle) relative to this surface, it will be totally internally reflected along ray path 336 as shown. Ray 336 will emerge from the upper surface 322 of prism 302 so as to traverse the sample area as ray 338. This ray will enter the lower horizontal surface 320 of prism 300 at point 340, and will then travel to point 342 on surface 344 of the upper prism. At this point (342) the ray will be totally internally reflected so as to proceed along ray path 348. Ray 348 will then strike the left-hand, slanted surface 308 of prism 300 at point 350.

Although in the end view of FIGURE 9, point 350 appears to be again at the cemented surfaces 318 of small prism 310 and upper prism 300, it may be readily seen from FIGURE 8 that this is not really the case, point 350 being considerably to the left as seen in FIGURE 8. Thus, the cell illustrated in FIGURES 8 and 9 will cause the laser beam to make the closed narrow rectangular path illustrated in FIGURE 9, and at the same time the ray or beam will be going away into the plane of the paper in FIGURE 9 (i.e., to the left in FIGURE 8). Thus, the beam, instead of making a back-and-forth traversal of the type shown in FIGURE 2, will actually make a very narrow rectangular helix configuration (of decreasing pitch), as may be seen by a comparison of FIGURE 8 and FIGURE 9.

Where it is desirable, as in the present case, to maintain the irradiated portion of the sample volume as a relatively narrow area, the incoming laser beam may be introduced near the apieces of the two prisms 300 and 302 as shown in FIGURE 9. Since the distance from the apex will determine the width of the rectangular path as viewed in FIGURE 9, the shape of the monochromator slit may be closely approximated by choosing the correct point of entry of the laser beam relative to the apex of the upper prism. Where it is desirable to make this rectangle as narrow as possible, the small prism 310 may be placed at the extreme top of surface 308 so that its upper surface 314 is level with the apex of the large upper prism 300. In fact, it is possible to use two small prisms of the type shown in 310, one on either side of the apex in order to make a flat nose on the prism 300. Alternatively, a small part of prism 300 may be made flat at its apex to allow entry of the beam. When the beam is introduced so that it essentially straddles the apex or center line of prism 300, part of the beam rays will follow the path illustrated, while part will go in the opposite direction, as will be obvious from the geometry. In this manner the actual width of the rectangle, exemplified by the paths shown in FIGURE 9, may be reduced to essentially the original width of the laser beam.

Although FIGURES 8 and 9 illustrate the upper and lower total internal reflecting beams 300 and 302 as solid right angle prisms, it is obvious that the same effect may be accomplished by using similar but somewhat different configurations. For example, prism 300 (and of course prism 302) may be replaced by a pair of parallel plates running along the lines of the upper surfaces 308 and 344 of the prism. When such a configuration is utilized the sample liquid should preferably fill the entire volume so that the lower slanting surfaces of such a plate is in contact with a substance having an index of refraction similar thereto to avoid light losses. The upper surface of such slanted plates would act in the same manner as upper surfaces 308, 344 of prism 300, since they would be a boundary between a high index of refraction material and a low one (i.e., air); but the lower surface of such plates would be a boundary only between two similar index of refraction materials and therefore would not cause a substantial amount of reflection. For this reason the lower surface 320 of prism 300 does not cause any substantial amount of reflection either (and, in fact, causes even less loss because of the substantially zero angle of incidence).

The total internal reflecting type of sample cell shown in FIGURES 8 and 9 has some advantages over the reflecting material type of cells shown in FIGURES 2 and 3, for example. Because the reflections at the outer surface of the prisms 300 and 302 are the type which are of the total internal type, the amount of energy lost at each reflection is immeasurably small, as long as the surfaces are kept clean. On the other hand, one of the disadvantages stems from this same fact, namely, that the outside reflective surfaces of prisms 300, 302 must be free of dirt in order to avoid substantial losses therethrough. Since the part of the prism traversed by the rays provides no useful Raman radiation, but only reduces the intensity of the laser beam by absorption losses, it would be generally preferable to remove at least the central part of the prism. FIGURE 10 illustrates at 300′ one example of such modified prism, there being many other readily apparent examples of embodiments.

Prism 300′ in FIGURE 10 will cause the ray paths to be the same as in FIGURE 9, so that the same or corresponding rays are indicated by priming the corresponding reference numerals in FIGURE 9. The only substantial difference between the prism shown in FIGURES 9 and 10 is the removal of the material so as to leave a rectangular cavity at 370. Preferably the cell is filled completely so that cavity 370 includes the liquid sample, thereby minimizing reflection losses at surface 372. Since the two parts of prism 300′ to the left and right of the rectangular removed portion 370 do not affect the light paths, these portions 374, 376 of prism 300′ may have any shape desired. In fact the cell may be designed so that only the portion of the prism above the surface 372, shown at 378, need be of optical quality material, portions of 374 and 376 being replaced by any desired shape closure walls or members.

It should be noted of course that it is the line along the upper apex of prism 300 and the line along the lower apex of prism 302 in FIGURE 8 that should be slightly canted relative to each other in order for the upper and lower reflective means to cause the reflected beams to become closer and closer together in the longitudinal direction upon each reflection in a manner analogous to that shown in FIGURE 2. Such a relative cant is easily effected by putting a small shim at either end of one of the two prisms before it is cemented or otherwise attached in a liquid-tight manner to the end windows 68′ or 69′. As with the FIGURE 2 type of cell, it is not absolutely necessary to introduce such a cant angle in order to provide a useful cell, as long as the angle of incidence of the original beam is quite small. However, to increase the number of traversals (and concurrently decrease the longitudinal distance between traversals at the left-hand end of the cell) without lengthening the cell, it is preferable that a suitable extremely small cant angle should be introduced between the two prisms 300 and 302.

*Summary*

In summation, the three different embodiments of sample compartments of FIGURES 2 and 3, FIGURES 6 and 7, and FIGURES 8 and 9 (with the additional minor variation of FIGURE 10) have certain basic characteristics in common. The primary similarity is that all cause the irradiating beam to make many traversals back and forth through the sample in a path which falls within a narrow rectangle (so as to be suitable for imaging on the entrance slit of a monochromator or other measuring instrument). The number of traversals and the closeness together thereof (as measured along the length of the cell or sample compartment) is preferably increased by canting the longitudinal axes of the upper and lower reflectors. The embodiment of FIGURES 2 and 3 and the embodiment of FIGURES 8 and 9 (and FIGURE 10) are particularly adapted for use with well collimated light, for example, a laser beam from a laser operating in a single mode. The use of a single curved surface as shown in FIGURES 6 and 7 will normally be advantageous whenever the irradiating beam has any substantial amount of divergence, whether of the point source, continuous extended source, or of the discontinuous extended type of a laser when operating at multiple modes.

The curvature of one of the reflective surfaces (e.g., the lower surface in FIGURES 6 and 7) should be chosen for conventional (i.e., point source) divergence so that the beam divergence is neutralized within a relatively few passes back and forth through the cell, in the manner shown in FIGURE 7. However, it should be remembered that both the divergence and the curvature are greatly exaggerated in FIGURE 7 from the true conditions which will occur in practice. In a laser, even in multiple mode, the actual amount of divergence of the beam will be quite small so that the degree of curvature of the reflective surface 256 in FIGURE 7 will really be extremely small. In the ideal case the point (in any real operation the small plane segment) from which the beam diverges would be at the focus of the curved mirror surface 256 so that the rays divergence is completely cancelled by the first reflection from the surface, and the rays after a single further reflection from the upper surface 54 will be made to converge again. This will limit the width of the beam to no more than the width it reaches at the first reflection from the spherical surface (i.e., between points 266 and 286 in FIGURE 7). However, this relationship need not in practice be followed so that FIGURE 7, which requires two reflections from the lower curved surface, rather than one, in order to collimate the beam, is a quite suitable embodiment, even though it is intended to be merely exemplary. It should be noted also that though the lower reflective surface is shown as curved in FIGURES 6 and 7, it is obviously a matter of choice whether the lower or upper surface is so curved. In fact, both of these surfaces may be curved, the combined dioptric power of the two surfaces then being considered in determining the curvature for the particular divergence of the beam being utilized.

Although both of the embodiments shown in FIGURES 2 and 3 and in FIGURES 8 and 9 both utilize similar types of reflectors at the top and bottom of the sample area or compartment, it is obvious that this need not necessarily be done in practice. In other words, a sample cell having a dielectric coating type of reflector as the upper reflector and a prism (i.e., total internal reflector) as the lower reflector may obviously be utilized, or vice versa. Similarly, though the embodiment illustrated in FIGURES 6 and 7 has a curved lower surface and a flat reflective coating type of upper reflector, it is obvious that a different type of reflector (such as a prism) may be utilized for the upper flat reflecting surface 54.

The invention provides a technique for irradiating a sample volume at a high effective flux density, in which the volume, shape and extent of the irradiated parts of the sample may be well controlled, so as to match its geometric characteristics with the entrance slit of a monochromator, for example. In addition, by utilizing a laser as the irradiating beam, the invention allows performance of photoelectric Raman spectroscopic measurements (or relatively rapid, direct photographing of the spectrum) without all of the attendant problems of heat dissipation and the like of the prior art. Conceptually, this is accomplished by the inventive use of a multiple traversal of the sample volume by the irradiating beam in a controlled path, so that the different traversals are very close together and form a geometric pattern having the desired general shape (i.e., slit-like) for collection of the Raman radiation.

Although the invention has been illustrated by means of various specific embodiments, the invention is not limited to the details of any of these, but rather is defined by the following appended claims.

What is claimed is:

1. A Raman spectrometer for irradiating a sample, gathering the consequent secondary radiation emitted by the sample, and measuring said emitted secondary radiation at various frequencies, comprising:

means for supporting a sample at a sample location;

a pair of radiant energy reflective means on opposite sides of said sample location;

said reflective means facing each other and being effectively at least almost mutually parallel;

source means for supplying a narrow substantially monochromatic radiant energy beam at a relatively small angle of incidence on one of said facing reflective means;

whereby said beam will be reflected back and forth repeatedly through said sample location by said reflective means;

optical means for collecting the secondary radiation from said sample;

the optical axis of said optical collecting means making a substantial angle to said source radiant energy beam, so that very litle of said source radiant energy is directly collected;

and means for detecting and indicating the intensity of said collected, emitted secondary radiation at various frequencies over a range near the frequency of said monochromatic source energy.

2. A Raman spectrometer according to claim 1 in which said detecting and indicating means comprises:

a monochromator receiving said collected secondary radiation;

and means for measuring the intensity of at least some narrow frequency bands of the collected secondary radiation after isolation thereof by said monochromator.

3. A Raman spectrometer according to claim 2, in which:

said monochromator is of the scanning type so as to yield at its exit end a constantly variable, narrow frequency band of the collected secondary radiation;

and said measuring means comprises means for recording the intensity of the radiation at the exit of said monochromator and the frequency setting of said scanning monochromator over a continuous range.

4. A Raman spectrometer according to claim 1, in which:

said radiant energy beam from said source is substantially plane polarized;

and a polarizing analyzer means is positioned in said collected secondary radiation;

whereby depolarization measurements may be made.

5. A Raman spectrometer according to claim 4, in which:

at least one of said planes of polarization of said source and said analyzer is rotatable;

whereby depolarization measurements for different planes of polarization may be made.

6. A Raman spectrometer according to claim 1, in which:

said optical means for collecting said secondary radiation and said intensity detecting means include an elongated slit substantially in that focal plane of said optical means which is conjugate to the irradiated part of said sample location;

said reflective means being at those opposite sides of said sample location corresponding to the top and bottom of the long dimension of said slit;

said reflective means being so formed as to maintain said reflected beam in a relatively narrow region corresponding to the width of said slit;

whereby said optical system efficiently collects the secondary radiation from said sample through said slit.

7. A Raman spectrometer according to claim 1, in which said optical means comprises;

a main collecting system for gathering secondary radiation leaving said sample location in a first general direction and for presenting it to said intensity detecting means;

and an auxiliary collecting system for intercepting secondary radiation leaving said sample location in at least a second general direction, substantially different from said first direction, and for returning said second direction secondary radiation to said main collecting system for presentation thereby to said intensity measuring means, whereby the effective gathering ability of said main collecting system is substantially increased.

8. A spectrometer according to claim 1, in which:

said reflective means are slightly tilted from parallelism by a very small cant angle therebetween;

said reflected beam thereby making successive angles of incidence with each of said reflective means which diminish by an amount equal to twice said cant angle between consecutive reflections by the same reflective means;

said successive angles of incidence thereby becoming smaller and smaller until said reflected beam impinges on one of said reflective means at an angle no greater than said cant angle, and is therefore reversed in direction at the next reflection so as generally to retrace its path back through the cell.

References Cited

UNITED STATES PATENTS

| 3,369,444 | 2/1968 | Patrignani | 88—14 |
| 2,690,078 | 9/1954 | Phillips | 88—14 |
| 2,940,355 | 6/1960 | Cary | 88—14 |

OTHER REFERENCES

Candler C.: Practical Spectroscopy, Hilger & Watts Ltd. 1949, pp. 141–143.

Chantry et al.: Interferometric Raman Spect. Using Infra-Red Excitation; Nature, vol. 203, No. 4949, September 1964, pp. 1052–3.

Harrison et al.: Practical Spectroscopy, Prentice-Hall, 1948, pp. 509, 510, 514–521.

Welsh et al.: Multiple Reflection Raman Tubes, JOSA, vol. 10, No. 41, October 1951, pp. 712–714.

JEWELL H. PEDERSEN, *Primary Examiner.*

B. J. LACOMIS, *Assistant Examiner.*